United States Patent
Phamhuu et al.

(10) Patent No.: US 8,574,419 B2
(45) Date of Patent: Nov. 5, 2013

(54) CHEMICAL REACTOR WITH NANOMETRIC SUPERSTRUCTURE

(75) Inventors: Cuong Phamhuu, Saverne (FR); Nicolas Keller, Strasbourg (FR); Jacques M. Ledoux, Strasbourg (FR); Izabella Janowska, Strasbourg (FR); David Edouard, Molsheim (FR); Valérie Keller-Spitzer, Oberschaeffolsheim (FR); Thierry Romero, Strasbourg (FR); Liu Yu, Strasbourg (FR)

(73) Assignees: Centre National de la Recherche Scientifique, Paris Cedex (FR); Universite de Strasbourg, Strasbourg (FR)

( * ) Notice: Subject to any disclaimer, the term of this patent is extended or adjusted under 35 U.S.C. 154(b) by 615 days.

(21) Appl. No.: 12/744,326

(22) PCT Filed: Nov. 26, 2008

(86) PCT No.: PCT/FR2008/001643
§ 371 (c)(1),
(2), (4) Date: Oct. 18, 2010

(87) PCT Pub. No.: WO2009/098393
PCT Pub. Date: Aug. 13, 2009

(65) Prior Publication Data
US 2011/0123409 A1  May 26, 2011

(30) Foreign Application Priority Data
Nov. 30, 2007  (FR) ..................... 07 08411

(51) Int. Cl.
*C23C 28/00* (2006.01)
*C01G 23/047* (2006.01)
*B01J 8/02* (2006.01)

(52) U.S. Cl.
USPC ........... 205/191; 205/171; 205/189; 422/211; 422/603; 423/345; 423/610; 977/742; 977/762; 977/891

(58) Field of Classification Search
USPC ........... 422/211, 603; 210/660, 681; 423/345, 423/610; 205/171, 189, 191; 977/742, 762, 977/891
See application file for complete search history.

(56) References Cited

U.S. PATENT DOCUMENTS 4,264,424 A * 4/1981 Niedrach ............... 204/421
2003/0116503 A1 * 6/2003 Wang et al. ............ 210/660

(Continued)

FOREIGN PATENT DOCUMENTS

EP  0543752 A1  5/1993
EP  1852176 A1  11/2007

(Continued)

OTHER PUBLICATIONS

Keller N. et al., "Synthesis and characterisation of medium surface area silicon carbide nanotubes", Carbon, Elsevier, Oxford, GB, vol. 41, No. 11, Jul. 31, 2003, pp. 2131-2139.

(Continued)

*Primary Examiner* — Walter D Griffin
*Assistant Examiner* — Huy-Tram Nguyen
(74) *Attorney, Agent, or Firm* — Edwards Wildman Palmer LLP; Barry Kramer; Joohee Lee

(57) ABSTRACT

The invention relates to a chemical reactor with a nanometric superstructure, comprising at least one member wherein at least one reaction chamber is arranged, and said reaction chamber being filled at least partially with a high specific surface area material having a specific surface area greater than 5 $m^2/g$, and characterized in that said high specific surface area material is selected from nanotubes or nanofibers. These nanotubes or nanofibers are preferably selected in the group consisting of carbon nanofibers or nanotubes, β-SiC nanofibers or nanotubes, $TiO_2$ nanofibers or nanotubes.
They may be deposited on an intermediate structure selected in the group consisting of glass fibers, carbon fibers, SiC foams, carbon foams, alveolar β-SiC foams, said intermediate structure filling the reaction chamber of said reactor at least partially.

14 Claims, 6 Drawing Sheets

(56) References Cited

U.S. PATENT DOCUMENTS

| | | | |
|---|---|---|---|
| 2005/0040090 A1 | 2/2005 | Wang et al. | |
| 2005/0098204 A1* | 5/2005 | Roscheisen et al. | 136/263 |
| 2005/0224360 A1* | 10/2005 | Varghese et al. | 205/171 |
| 2006/0078726 A1* | 4/2006 | Antonio et al. | 428/328 |
| 2006/0105141 A1* | 5/2006 | Ku et al. | 428/131 |
| 2006/0193766 A1* | 8/2006 | Hasegawa et al. | 423/610 |
| 2006/0199473 A1* | 9/2006 | Suzuki et al. | 451/8 |
| 2009/0068051 A1* | 3/2009 | Gross | 419/2 |

FOREIGN PATENT DOCUMENTS

| | | |
|---|---|---|
| FR | 2832649 A1 | 5/2003 |
| FR | 2885898 A1 | 11/2006 |
| FR | 2915745 A1 | 11/2008 |
| WO | WO-2008152221 A2 | 12/2008 |

OTHER PUBLICATIONS

Bavykin et al., "TiO2 nanotube-supported ruthenium(III) hydrated oxide: A highly active catalyst for selective oxidation of alcohols by oxgen", Jnl. of Catalysis, Academic Press, vol. 235, No. 1, Aug. 18, 2005, pp. 10-17.

Janowska, Wine, Ledoux, Pham-Huu: "Structured silica reactor with aligned carbon nanotubes as catalyst support for liquid-phase reaction", Jnl of Molecular Catalysis A: Chemical, vol. 267, Nov. 18, 2006, pp. 92-97.

Zhu, Zhang, Wang et al., "Synthesis and catalytic performance of TiO2 nanotubes-supported copper-oxide for low-temperature CO oxidation", Microporous and Mesoporous Materials, vol. 102, Jan. 22, 2007, pp. 333-336.

Josset, Taranto, Keller et al., "UV-A photocatalytic treatment of high flow rate air comtamined with *Legionella pneumophila*", Catalyst Today, vol. 129, Sep. 18, 2007, pp. 215-222.

* cited by examiner (a)  (b)

(a)

(b)

(c)

(a)  (b)

(a)  (b)

(a) (b) (c)

(a) (b)

(a) (b) (c)

CHEMICAL REACTOR WITH NANOMETRIC SUPERSTRUCTURE

FIELD OF THE INVENTION

The present invention relates to the field of chemical reactors, and more specifically the field of catalytic or photocatalytic reactors.

STATE OF THE RELATED ART

In recent years, chemical engineering specialists have placed specific interest in microreactors, both catalytic and not. The reasons for this are multiple: in catalysis, the small size thereof results in a large surface area to volume ratio, promoting contact with the reagents and the active sites in a laminar flow mode. In a small reactor, mass and heat transfer phenomena are significantly exacerbated and produce isothermal reactions with no diffusion, giving rise to an almost instantaneous equilibrium of the reagent concentration at any point of the system, and a high level of temperature homogenisation in the catalytic bed. The superior temperature control makes it possible to improve installation securing problems during start-up stages very significantly, particularly for highly exothermal or explosive reactions. The homogenisation of the temperature in the catalytic bed, particularly the lack of hot spots, makes it possible to reduce parasitic reactions and thus improve the overall selectivity of the method. One can promote the interest of microreactors for any type of system that is powdered or in film or layer to immobilise format and that presents problems of increase in scale and weak interfacial surfaces. It is also important to note the interesting potential for photochemical reactions, in terms of a greater spatial illumination homogeneity and superior light penetration throughout the thickness of the photoactivatable material, compared to larger reactors. This makes it possible to increase the interface with light and thus maximise the efficiency thereof.

Moreover, microreactors are flexible and can be used easily. Indeed, to increase production, it is easy to set up a plurality of reactors in parallel with identical behaviour, thus reducing the cost of the intermediate validation steps of the method which are generally costly and sometimes difficult to predict.

Numerous types of microreactors are known, for example mixer, filter, heat exchanger, catalysis types. In catalysis type microreactors, the deposition of the active phase in the microreactor channels is performed according to the prior art in a number of ways:

According to a first method, a porous intermediate layer, commonly referred to as a "washcoat" layer, based on oxide, generally alumina, silica or any other binary mixture of these two oxides, is first deposited on the internal walls of the channel(s) forming the microreactor. A prior surface treatment of the walls is frequently required to ensure satisfactory wetting and bonding of the washcoat layer on this wall. The washcoat layer generally has a very large specific BET surface area, in the region of 100 to 500 $m^2g^{-1}$, enabling satisfactory dispersion of the active phase on the entire effective surface of the microreactor. The active phase, e.g. metal, oxide, silico-aluminates, is then deposited on the washcoat layer and subjected to a heat treatment to convert the precursors of the active phases into the active homologues thereof for the reaction in question.

According to a second method, the active phase is mixed directly with the precursors of the substrate (washcoat) in the form of a sol, and deposition is then performed by soaking the microreactor in said solution. The charged microreactor then undergoes various thermal steps to obtain the suitable catalyst for the reaction in question.

According to a third method, a solution containing the dispersed substrate and active phase is circulated via the reactor channels, followed by heat treatments to form a solid layer acting as a catalyst. The thickness of the layer and the bonding thereof on the reactor surface may be adjusted by means of the viscosity of the solution and the concentrations of the elements for deposition.

To avoid mechanical machining of small diameter channels, photolithography has been used. The article "Photocatalytic redox-combined synthesis of L-pipecolinic acid with a titania-modified microchannel chip" by Go Takei et al, published in Catalysis Communications 6, p. 357-360 (2005), describes a microreactor consisting of two glass panels wherein channels approximately 0.77 µm wide were etched by means of photolithography. In these channels, a $TiO_2$ washcoat was deposited and, on said washcoat, a platinum-based active phase. In the reaction in question, $TiO_2$ also acts as a photocatalyst. The article "High Surface Area Titania Photocatalytic Microfluid Reactors" by H. Lindstrom et al, published in AIChE Journal, vol. 53, No. 3, p. 695-702 (March 2007) describes various methods for depositing thin layers of $TiO_2$ in microchannels created by means of photolithography in glass panels.

However, photolithography does not appear to be suitable for all substrates. The article "Photocatalysis in microreactors" by R. Gorges et al, published in J. Photochemistry and Photobiology A: Chemistry, vol 167, p. 95-99 (2004), describes the deposition of $TiO_2$ in channels having a cross-section of 200 µm×300 µm formed by mechanical machining in a ceramic substrate.

The article "Photosensitized oxidation of citronellol in microreactors" by S. Meyer et al, published in J. Photochemistry and Photobiology A: Chemistry, vol 186, p. 248-253 (2007) describes the use of a further type of photochemical microreactor made of vitreous material.

Microreactors are also known wherein the channels are interspersed with micrometric sized blocks, intended to increase the surface area to volume ratio of the reaction chamber, thus promoting superior mixing of the reagents and superior contact between the reagents and the catalyst. The production of such a system requires additional steps that burden the overall cost of the method. Furthermore, the bonding of a porous oxide layer on blocks is not easy and renders the dispersion of the active phase difficult.

The drawbacks associated with the use of microreactors according to the prior art are relatively numerous, and particularly include two aspects. A first aspect is the cost of machining the microreactors, due to the use of relatively complex techniques, such as photolithography or direct laser beam machining. A second aspect is the low heat conductivity of the washcoat layer (this layer is essential for satisfactory dispersion of the active phase); this layer may be detached following sudden temperature rises or drops, due to the difference in the expansion coefficients between the washcoat layer and the metal and the substrate contained in the microreactor. Detachment of the washcoat layer may degrade the satisfactory operation of the microreactor, particularly due to the progressive obstruction of the channels giving rise to head loss and the loss of activity.

Microreactors are also known wherein the walls are lined with carbon nanotubes, see FR 2 885 898 (French Atomic Energy Commission), or which contain carbon nanotubes deposited on a porous substrate (US 2005/0040090). However, these nanotubes do not withstand an oxidant environment at high temperatures well and may be impaired by some liquid phase products.

The problem addressed by the present invention is thus that of providing a novel chemical reactor, particularly a small volume reactor, suitable for use for catalysis applications and as mixers/exchangers, which is simpler to produce, more flexible in terms of assembly, sturdier, more compact and less expensive than known microreactors, as it is produced using machining techniques accessible with conventional power tools, which has a high resistance to a corrosive, particularly oxidant, chemical environment, even at high temperatures.

AIMS OF THE INVENTION

According to the invention, this problem is solved by a chemical reactor with a nanometric superstructure, comprising at least one member wherein at least one reaction chamber is arranged, and said reaction chamber being filled at least partially with a high specific surface area material having a specific surface area greater than 5 $m^2/g$, and characterised in that said high specific surface area material is selected from SiC (advantageously β-SiC) or $TiO_2$ nanotubes or nanofibres.

They may be deposited (i) either directly on a wall of the reaction chamber of said reactor, said reactor optionally being a capillary reactor, (ii) or on the wall of a channel provided in at least one wall of the reaction chamber of said reactor, (iii) or on an intermediate structure selected in the group consisting of glass fibres, carbon fibres, SiC foams, carbon foams, alveolar β-SiC foams, said intermediate structure filling the reaction chamber of said reactor at least partially.

Preferentially, the specific surface area of said high specific surface area material is at least 15 $m^2/g$, and more preferentially between 30 $m^2/g$ and 300 $m^2/g$.

A further aim of the present invention is the use of this reactor for catalytic or photocatalytic reactions, particularly CO oxidation to $CO_2$, alcohol oxidation, hydrocarbon hydrogenation, hydrocarbon dehydrogenation, organic compound hydrogenation.

A further aim of the present invention is the use of the reactor as a filter for filtering the ions dissolved in liquid phases or bacteria or viruses in liquid or gas phases.

A further aim of the present invention is a method for producing a reactor as described above, wherein:

(a) at least one substrate consisting of a member of a reactor or an intermediate structure, to be inserted in said reactor, is procured, selected from the group consisting of glass fibres, carbon fibres, SiC foams, carbon foams, alveolar β-SiC foams;

(b) carbon nanotubes or nanofibres are deposited on said substrate, (c) said carbon nanotubes or nanofibres are converted into β-SiC nanotubes or nanofibres;

(d) optionally, said substrate coated with β-SiC nanotubes or nanofibres is calcined at a temperature between 800° C. and 1100° C., and a layer of aluminosilicate or zeolite is deposited;

(e) an active phase or an active phase precursor is deposited, followed, in the latter case, by the activation of said precursor.

A further aim of the present invention is a method for regenerating a reactor according to the invention, wherein said reactor or one of the members thereof comprising SiC or $TiO_2$ nanotubes or nanofibres is calcined at a temperature above 500° C., and advantageously between 500° C. and 700° C.

(a) Direct brazing assembly.

(b) Assembly by means of a seal 5. The clamping bolts (see (c)) are not shown.

(c) Perspective view, with clamping bolts 7 and 6 nuts and fittings 8 for the gas inlet and outlet (not represented in views (a) and (b)).

Figure 1:
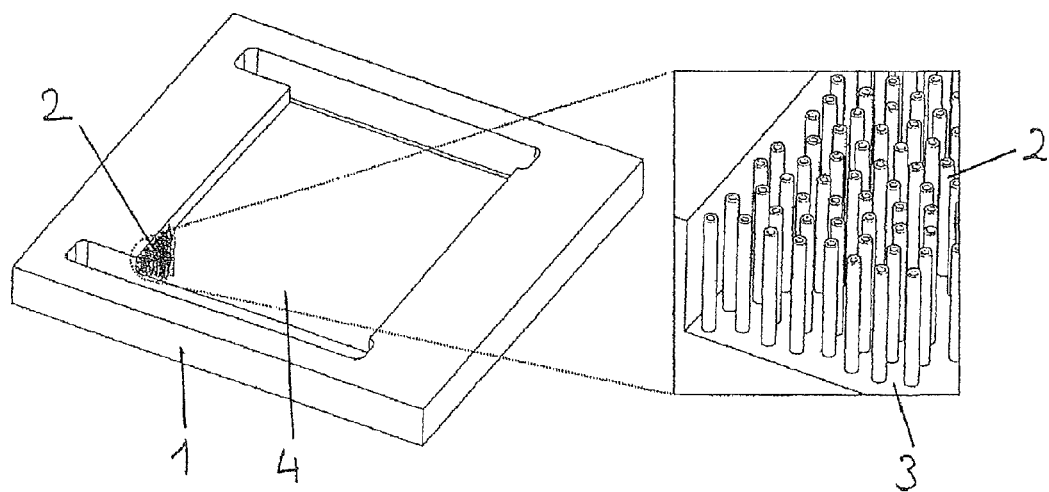
FIG. 1 represents a principle diagram of an embodiment of a reactor according to the invention. In the base plate 1, aligned nanotubes 2 formed from the lower surface 3 of the reaction chamber 4 making up the hierarchised structure multi-scale reactor can be discerned.
Figure 4:
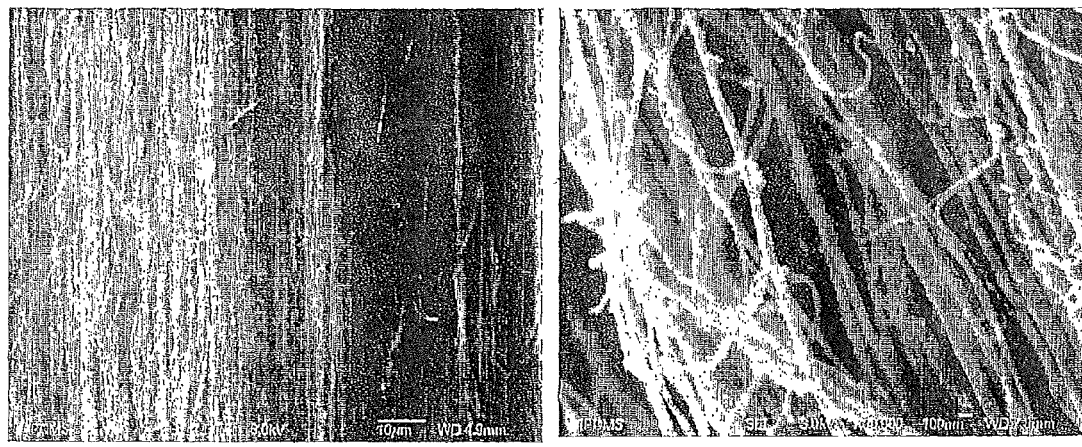

FIG. 4 represents scanning electron microscope (SEM) images of aligned carbon nanotubes having an approximate diameter of 100 nm obtained in the channel of the steel panel serving as the host structure for the reactor for which the diagram is represented in FIG. 1. According to the invention, these nanotubes may then be converted into β-SiC nanotubes or nanofibres.

Figure 5:
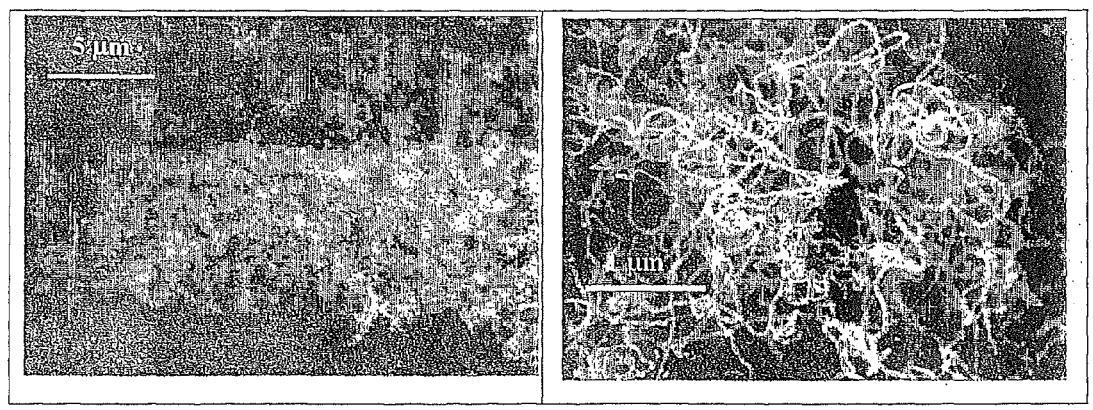

FIG. 5 represents SEM images of carbon nanofibres on millimetric/micrometric sized glass fibres located in the channels of a microreactor according to a further embodiment of the invention. According to the invention, these nanotubes may subsequently be converted into β-SiC nanotubes or nanofibres.

Figure 6:
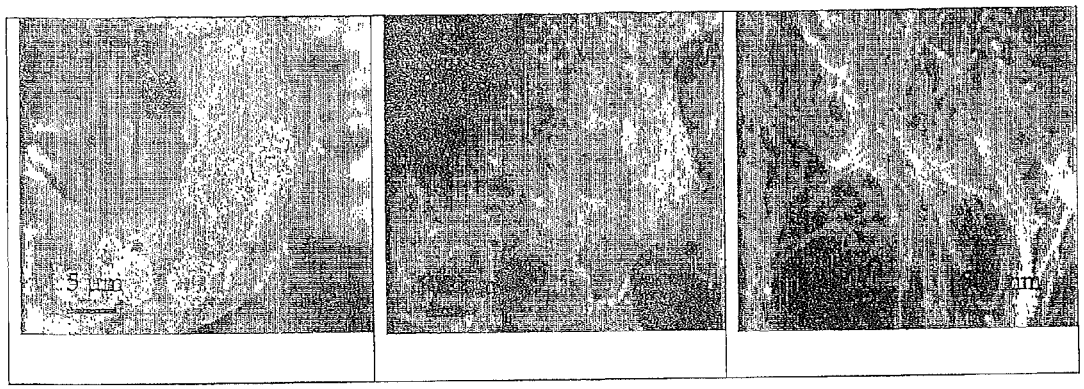

FIG. 6 represents SEM images (two different magnifications) of $TiO_2$ nanotubes on micrometric glass fibres located in the channels of a microreactor according to a further embodiment of the invention.

Figure 7:
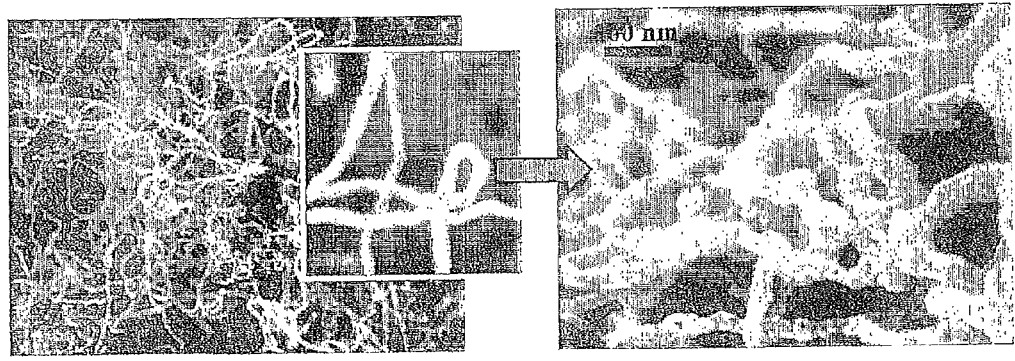

FIG. 7 represents SEM images of a homogenous coating of $TiO_2$ particles obtained on glass microfibres deposited in the channel of the steel panel of a reactor according to a further embodiment of the invention.

Figure 8:
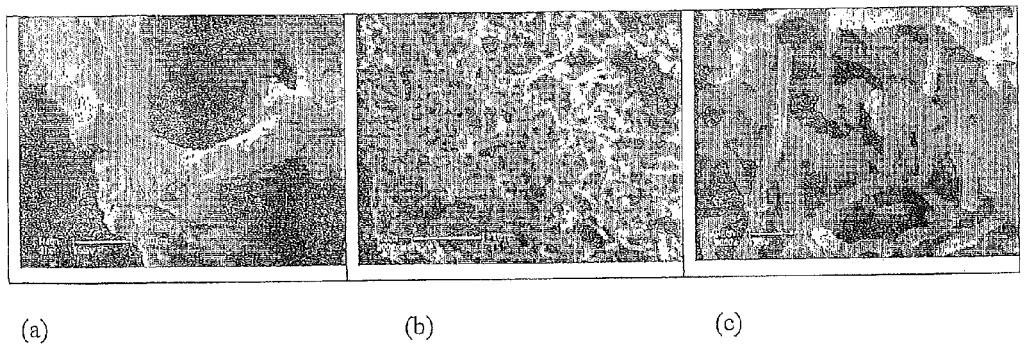

FIG. 8 represents SEM images of a $TiO_2$ deposition on SiC nanofibres deposited on an alveolar β-SiC foam located in the channels of a reactor according to a further embodiment of the invention.

(a): morphology at micronic scale.

(b) and (c): lattice of SiC nanofibres interlocked in the alveolar foam and coated with $TiO_2$.

Figure 9:
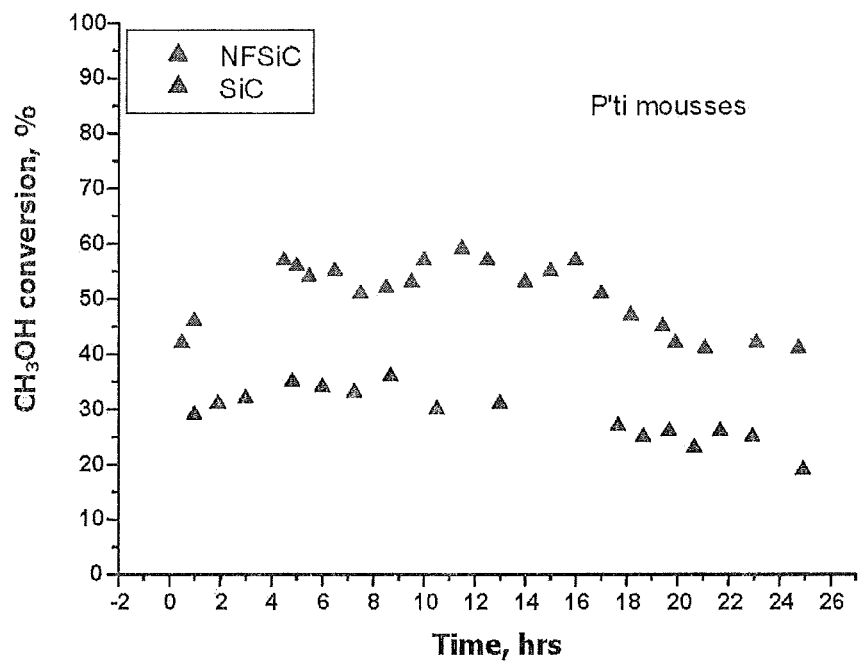

FIG. 9 shows the results of a test to determine the toluene and water mixing efficiency of a microreactor according to the invention, expressed by the mean size of the toluene droplets in μm (bars) and by the system segregation time (dots on the curve). Point A corresponds to a β-SiC foam without nanotubes, point B to a carbon felt without nanotubes, point C to a SiC nanotube or nanofibre system deposited on a β-SiC foam.

Figure 10:
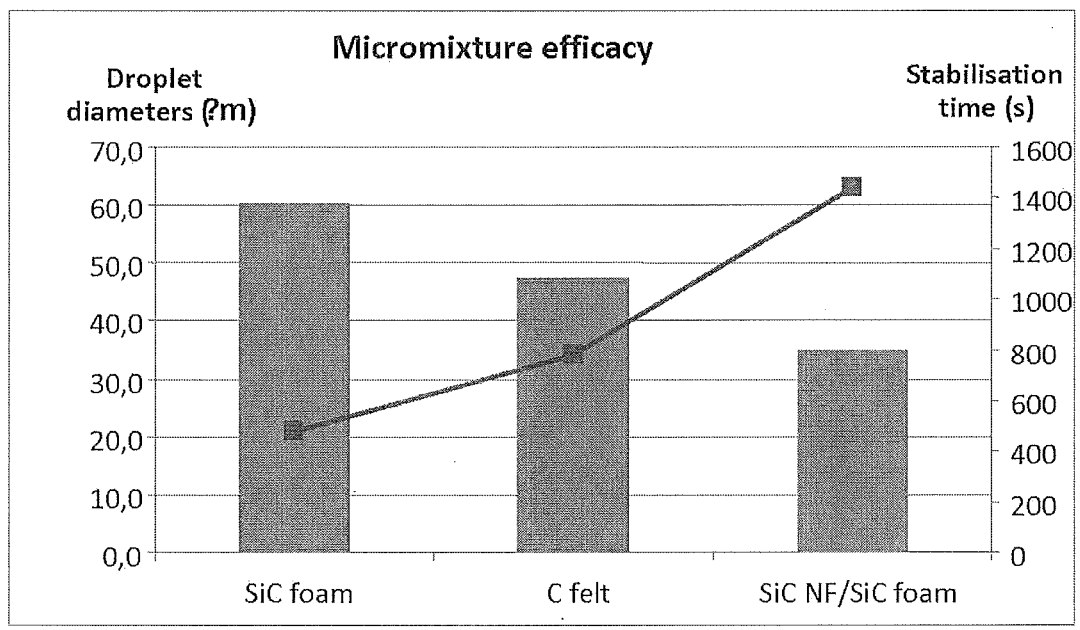

FIG. 10 shows the methanol conversion yield in a methanol dehydration reaction to dimethyl ether on zeolite H-ZSM5-based catalysts supported on an alveolar β-SiC-based foam, coated with a lattice of SiC nanofibres (curve B) or not (curve A).

DETAILED DESCRIPTION OF THE INVENTION

The reactor according to the invention has a macroscopic host structure represented by a reaction chamber wherein the smallest dimension is advantageously between approximately 0.5 mm and approximately 20 cm. In this macroscopic host structure, one or a plurality of superstructures are formed, wherein the smallest dimension is nanometric, i.e. less than one micrometer. This nanometric superstructure, which is an essential member of the present invention, significantly increases the surface area to volume ratio of the reaction chamber, without giving rise to a significant increase in head loss. Furthermore, this nanometric superstructure may be functionalised by means of various methods to ensure satisfactory bonding of the active phase on the surface thereof.

More specifically, the reactor according to the invention comprises a macroscopic host structure, i.e. a reaction chamber, wherein the free space is filled at least partially by nanomaterials in the form of SiC (particularly β-SiC) or $TiO_2$ nanofibres or nanotubes fixed on a substrate, said substrate optionally consisting of the actual wall of the reaction chamber, whereon a high specific surface area material consisting of nanofibres or nanotubes has been deposited. The nanofibres or nanotubes may be doped; for example, SiC may be doped with nitrogen, so as to modify the acid-basic features of the surface thereof.

Advantageously, according to the invention, the nanofibres or nanotubes are at least partially aligned or comprise zones wherein they are aligned. Said nanomaterials may comprise a catalytically active phase, or a catalytically active phase precursor, if the reactor is intended for use in catalysis.

In one advantageous embodiment, the nanomaterials are deposited on an alveolar foam substrate, preferably alveolar carbon or β-SiC foam. It is thus possible to use a superstructure comprising $TiO_2$ or β-SiC nanofibres or nanotubes deposited on an alveolar carbon or β-SiC foam, typically in the form of panels.

The coupling of a nanoscopic superstructure (SiC or $TiO_2$ nanofibres or nanotubes) with an alveolar foam is intended to increase the specific surface area in the core of the reactor (surface area required for optimum deposition of an active metallic phase) without impairing the remarkable properties of the alveolar foams in terms of fluid flow (low head loss, see reference [1]), heat and mass transfers, see references [2], [3] and [5]. The alveolar structure may be prepared by means of techniques known to those skilled in the art before the assembly of the reactor.

A hierarchised structure reactor is thus obtained with enhanced mass, heat and light transfer with a view to the use thereof in catalysis and/or photocatalysis applications as simple mixers and/or heat exchangers.

On the $TiO_2$ or SiC nanofibres or nanotubes, it is possible to deposit an active phase or active phase precursor, or a metal oxide by means of a hydrothermal process or using a gas phase. For example, on β-SiC nanofibres or nanotubes, it is possible to deposit alumina, zeolites, zirconia, albanite, $TiO_2$. Similarly, on $TiO_2$ nanotubes or nanofibres, it is possible to deposit albanite, zirconia, zeolites. These metal oxides may be used directly as a catalyst or photocatalyst, or a further active phase may be deposited thereon. Advantageously, these nanofibres or nanotubes are aligned on at least one zone.

Advantageously, the SiC or $TiO_2$ nanofibres or nanotubes formed have a mean diameter between 40 and 200 nm, more specifically between 50 and 150 nm and especially between 60 and 120 nm. Advantageously, the β-SiC nanofibres or nanotubes formed have a mean length between 50 and 4000 μm, more specifically between 100 and 3000 μm and especially between 500 and 2000 μm. The SiC nanofibres or nanotubes may be obtained by converting SiC nanofibres or nanotubes, as explained above, or by means of any suitable method.

Within the scope of the present invention, the terms "carbon nanotubes or nanofibres" and "carbon-based nanostructured compounds" refer herein to highly ordered atomic structure tubes or fibres, consisting of graphite type hexagons, which may be synthesised under certain conditions (see the articles "Carbon nanotubes" by S. Iijima, published in the journal MRS Bulletin, p. 43-49 (1994), and "Carbon nanostructures for catalytic applications" by M. J. Ledoux and C. Pham-Huu, published in the journal Catalysis Today, 102-103, p. 2-14 (2005))). It is known that, under vapour deposition synthesis conditions, particularly according to the catalysts used, it is possible to obtain either hollow tubes, optionally formed from a plurality of concentric tubes having different diameters, or solid fibres, filamentous, but containing graphite carbon in a typically less ordered form. Said tubes or fibres may have a diameter typically between 2 and 200 nm, said diameter being substantially uniform on the entire length of each tube or fibre.

This term is also used, mutatis mutandis, for SiC and $TiO_2$ nanofibres or nanotubes.

The macroscopic host structure may be machined in materials, frequently in the form of panels, made of materials based on silicon, glass, quartz, ceramic, aluminium, titanium, steel, plastic, or other suitable materials. Various members made of various materials may be combined.

1. Production of Hierarchised Structure Reactors According to the Invention.

We describe herein three typical embodiments of the reaction according to the invention. In all cases, a macroscopic host structure, such as a metal panel, is first prepared, whereon a reaction chamber, in the form of a cavity, a plurality of at least partially interconnected cavities, a channel or a plurality of at least partially interconnected channels, is machined. The panel may be made of any material compatible with the envisaged use of the reactor, particularly metallic or non-metallic material, for example ceramic or plastic material. If it is desired to deposit the nanofibres or nanotubes directly on the wall of the reactor, the material of the panel must also be compatible with the nanotube or nanofibre preparation method. Preferably, a metallic material is used. In this case, the machine may be performed using conventional mechanical tools reducing the production cost. This host structure may be made in a plurality of portions, for example in a plurality of members or panels to be stacked.

The reaction chamber formed is connected to reagent inlet systems on either side of the host structure. The panel(s) wherein the reaction is machined may also be connected to a heating member (for example a heating plate), which supplies heat to the reactor, or a cooling member or coolant which removes heat from the reactor (for example by circulating a coolant stream opposite the reaction stream). The dimensions of the panel forming the macroscopic host structure are dependent on the intended applications and may range typically from a few centimetres to a few dozen or even hundreds of centimetres. The diameter of the channels may be between approximately one half-millimetre and a few dozen centimetres.

As a general rule, the deposition of the nanotubes or nanofibres on the host structure (or on the intermediate structure) may be performed either in situ, i.e. in the reactor according to the invention, or ex situ, i.e. in another reactor. In the latter case, the host structure, for example a metal panel, or the intermediate structure, for example a prepared SiC foam panel incorporating a lattice of SiC nanofibres, is then assembled in the channel or in the reaction chamber of the reactor.

Similarly, if it is desired to line the host structure or the intermediate structure with SiC nanotubes or nanofibres, the carbon nanotubes or nanofibres may be prepared or converted into SiC nanotubes or nanofibres either in situ, or (preferably, in view of the high temperatures required) ex situ. Similarly, the deposition of the active phase and the activation thereof may be performed in situ or ex situ.

1.1 Method A: Reaction Chamber Filled with a Lattice of Aligned β-SiC Nanofibres or Nanotubes.

According to a first production method (referred to as method A), the host macrostructure is prepared for example by machining in a metal panel, typically made of steel. Advantageously, the smallest dimension of the cavity or channel forming the reaction chamber is between approximately 0.5 mm and approximately 20 mm. The cavity of the steel (or other metal) panel may then be coated with a thin layer of $SiO_2$ acting as the nucleation and growth layer for the superstructures filling the channel cross-section.

As a general rule, the carbon nanotubes or nanofibres are grown in this channel cavity; these carbon nanotubes or nanofibres are then converted into β-SiC nanotubes or nanofibres by means of a reaction exposing same in situ to SiO molecules. As specified above, this conversion may be performed in situ or ex situ.

The growth of the carbon nanotubes aligned in the channel is advantageously performed by the passage of a mixture containing ferrocene ($Fe(C_5H_5)_2$, acting as a growth catalyst) diluted in toluene (acting as the source of carbon) or another hydrocarbon. The volume ratio between ferrocene and the hydrocarbon is between 0.1% and 40%, advantageously between 0.5% and 30%, and more advantageously between 1% and 25%. The catalyst and the source of carbon are in turn diluted in an argon stream acting as the carrier gas, the flow rate whereof can be used to adjust the dimensions and spacing of the nanoscopic superstructure. The growth temperature is between 750° C. and 1100° C., more advantageously between 780° C. and 950° C.; even more advantageously, it is at a temperature between 750° C. and 900° C. The reaction time is between 30 minutes and 10 hours, more specifically between 1 and 6 hours, and especially between 3 hours and 4 hours, according to the thickness of the channel to be filled (see FIG. 1). It is observed that, during growth, the carbon nanotubes penetrate deeply into the $SiO_2$ layer thus enabling superior bonding in the reactor channel. The strength of this hybrid system was assessed by submitting same to a sonication treatment in an ethanol solution for several hours. No loss was observed, confirming the significant bonding force of the system.

By means of a method described above ("Step (c)" of "method B"), the carbon nanotubes or nanofibres may be converted into β-SiC nanotubes or nanofibres. This is on the assumption that the macroscopic host structure can withstand the temperature of this conversion step, which may be selected between 1200° C. and 1600° C., with no unacceptable deformation. For this reason, β-SiC foam is preferred as the intermediate structure. Indeed, the same method as described above, mutatis mutandis, may be used to deposit SiC nanotubes or nanofibres on an intermediate structure.

In this embodiment, the arrangement of the nanofibres or nanotubes, particularly aligned nanofibres and nanotubes, makes it possible to increase the surface area to volume ratio of the reactor considerably. The specific surface area of these nanofibres or nanotubes is relatively high, in the region of 50 $m^2g^{-1}$ to more than 200 $m^2g^{-1}$, according to the synthesis conditions, and is essential external and devoid of ink-bottled pores. (The term "ink-bottled pore" refers to a pore wherein the inlet is not the widest point.) The high axial heat conductivity of the β-SiC nanofibres or nanotubes enables rapid heat transfer from the reaction site to the base wall (reaction chamber wall) of the reactor, thus reducing hot spot formation problems harmful for example for the selectivity of the method or liable to represent a safety risk when starting up the method.

Further growth catalysts that may be used for the deposition of the carbon nanotubes or nanofibres are, in particular, Ni, Fe, Co metals, which may be deposited by means of known methods, such as cathode spraying (sputtering) or spin coating. Growth is then performed by means of the passage of a hydrocarbon, preferably diluted, on said catalyst; the growth conditions are similar to those used for ferrocene.

The lack of ink-bottled pores is also a non-negligible advantage in catalytic reactions. Indeed, it is known that, during reactions between a gas phase containing reagents to be converted and a solid catalyst, the location of the active phase in relation to the porosity of the substrate is a very important factor affecting both the conversion ratio and the selectivity of the reaction. Indeed, when the active phase is located inside the porosity of the substrate (case of ink-bottled pores), the conversion and selectivity of the reaction may be influenced essentially by two factors:

(i) The diffusion of the reagents from the gas phase to the active sites: the deeper the location of the active phase in the substrate matrix, the greater the diffusion of the reagents, which could limit the reaction rate and give rise to a decrease in the conversion in relation to the intrinsic conversion expected in the absence of diffusion phenomena. This phenomenon is accentuated when the reagent flow rate is high as in the case of microreactors.

(ii) The back diffusion of the products from the active sites to outside the substrate is also very sensitive to the location of said active sites. Indeed, the greater the windings in the porosity, the greater the number of secondary reactions taking place during the back diffusion of the products from the outer surface, thus giving rise to substantial decrease in the overall reaction selectivity.

Factors such as the lack of ink-bottled pores and the nanometric size of the nanotubes or nanofibres having a high external surface area all have a favourable influence on the conversion and overall selectivity of the method.

The oxidation resistance of these β-SiC nanotubes or nanofibres is also high enabling uses in an oxidising atmosphere up to temperatures in the region of 800° C.

The fact that the nanotubes or nanofibres are aligned makes it possible increase the length thereof, which may be up to one or more millimetres. This represents an advantage particularly for the filtration application.

1.2 Method B: Reaction Chamber Filled with an Alveolar SiC-Based Foam Covered with a Lattice of SiC Nanofibres or Nanotubes.

Figure 2:
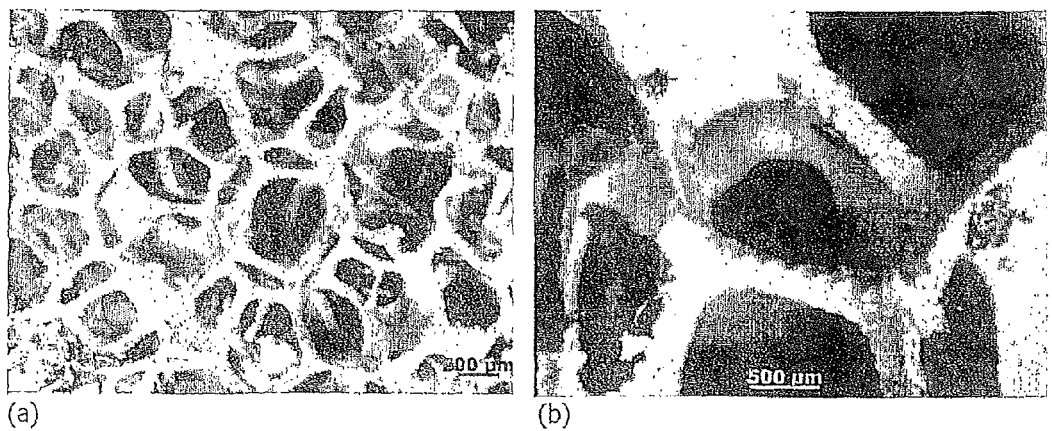
FIG. 2 represents optical micrographs of a β-SiC-based alveolar foam with a connection in three dimensions. This foam may form the substrate for the deposition of nanotubes or nanofibres in a further embodiment of a reactor according to the invention.

According to a second method (referred to as method B), the production of the reactor is divided into two separate steps: the first consists of machining the channel(s) receiving the superstructure, as in method A, the second consists of producing a panel mimicking the dimensions of the channel(s) of the host structure consisting of an alveolar foam consisting of a micrometric sized network (between approximately 100 μm and approximately 4000 μm) based on silicon carbide (β-SiC). The alveolar foam bed has a connected structure, continuous in the three dimensions (FIG. 2) and a high open porosity (greater than 0.7). These morphological properties of the alveolar bed combined with the good heat conductivity of silicon carbide enable high energy dissipation (which is known per se in numerous publications, see references [1], [2] and [3]) in the entire structure and a homogeneous distribution of the reagent fluid throughout the channel(s) of the panel forming the macroscopic host structure (which is known per se from references [2] and [3]).

The alveolar β-SiC foam is known per se. It may be obtained for example by means of the Prin method, comprising the impregnation of a polyurethane foam with a silicon powder suspension in an organic resin (see EP 0 624 560 B1, EP 0 836 882 B1 or EP 1 007 207 A1). The β-SiC foam, prepared according to the Prin method referenced above or by means of any other method, with a specific surface area greater than 10 $m^2/g$ is a particularly preferred intermediate structure for the embodiment of the present invention.

A method for growing carbon nanofibres or nanotubes, or SiC nanotubes or nanofibres, on an alveolar β-SiC foam substrate is described herein:

(a) Incorporation of a nanotube or nanofibre growth catalyst in the alveolar β-SiC foam.

This growth catalyst is intended to promote the growth of the carbon nanotubes or nanofibres. Advantageously, nickel is used, particularly to produce carbon nanofibres, or iron, cobalt or a mixture of iron and cobalt to produce nanotubes. Any other binary or ternary mixture of these three elements may also be used.

A typical embodiment for this step is described herein. The porous SiC substrate is impregnated with an active phase precursor. An aqueous or alcohol solution is suitable. The precursor may be a transition metal salt, for example $Ni(NO_3)_2$. The metal concentration is advantageously between 0.4% by mass and 3% by mass, and preferably between 0.5% and 2%. After impregnation, the whole is oven-dried, preferably at a temperature between 80° C. and 120° C. for 1 to 10 hours, and calcined in air or an inert atmosphere at a temperature between 250° C. and 500° C. The active phase precursor is then converted into the active phase, preferentially by means of a reduction in reducing gas at a suitable temperature, for example between 250° C. and 500° C. in hydrogen. The duration of this reduction is typically between 0.2 hours and 3 hours.

(b) Growth of carbon nanotubes or nanofibres from a mixture comprising at least one hydrocarbon and hydrogen.

The hydrocarbon is an aliphatic, olefinic, acetylenic or aromatic C1 to C10 hydrocarbon. The aliphatic, olefinic or acetylenic hydrocarbons may be linear or branched. Aliphatic or olefinic C1 to C4, particularly C2 or C3, hydrocarbons are preferred. Acetylene is also suitable. The aromatic hydrocarbons that may be used include toluene which, mixed with ferrocene, results, according to the observations of the present inventors, in the formation of aligned carbon nanotubes on a SiC substrate.

It is known from the article "Evidence of Sequential Lift in Growth of Aligned Multiwalled Carbon Nanotube Multilayers" by M. Pinault et al., Nano Letters Vol. 5 No. 12, p. 2394-2398 (2005)) that the CVD (Chemical Vapour Deposition) technique using aerosols containing a mixture of benzene or toluene or ferrocene results, on a silicon substrate, in the formation of aligned multiwalled carbon nanotubes.

Within the scope of the present invention, a gas mixture comprising at least one hydrocarbon and hydrogen is used. The temperature of the reaction should be between 300° C. and 1000° C., and is preferentially between 600° C. and 800° C.

One advantageous embodiment uses $C_2H_6$ at a temperature between 650° C. and 750° C., for a time of approximately 1 and 6 hours. The quantity of carbon nanofibres or nanotubes formed varies between 10 and 70% by weight in relation to the weight of the initial foam substrate.

(c) Conversion of carbon nanotubes or nanofibres into SiC nanotubes and nanofibres.

In this optional step, the carbon nanotubes or nanofibres are reacted with a SiO vapour in a heat treatment chamber. The SiO vapour may be produced in the heat treatment chamber, as close as possible to the carbon-containing structures to be converted into SiC. In one embodiment, SiO generation may be performed by heating a mixture of Si and $SiO_2$ placed in the proximity of the carbon nanotubes or nanofibres. In a further embodiment, the carbon nanotubes or nanofibres may be embedded in a SiC precursor matrix (this term is explained hereinafter) containing for example a mixture of Si and phenolic resin.

To obtain β-SiC, the reaction temperature is advantageously between 1000° C. and 1600° C., preferentially between 1200° C. and 1500° C., more preferentially between 1250° C. and 1400° C., and especially between 1280° C. and 1350° C. At higher temperatures, α-SiC is obtained.

According to the reaction time, partial or complete conversion of the carbon nanotubes or nanofibres into SiC, particularly β-SiC nanofibres, may be obtained.

In this way, steps (a) and (b), optionally followed by a step (c), give rise to a composite product comprising a porous SiC substrate, with carbon and/or SiC nanotubes or nanofibres. These nanotubes or nanofibres may be aligned, using as the hydrocarbon in step (b) a mixture formed (i) from at least one aromatic hydrocarbon, preferably toluene, and (ii) ferrocene.

One particularly preferred product is a β-SiC foam with a specific surface area of at least 10 $m^2/g$ comprising SiC nanofibres or nanotubes. Advantageously, the specific surface area of this product is at least 15 $m^2/g$, and especially between 30 $m^2/g$ and 300 $m^2/g$. This composite product may be used in a reactor according to the invention as the catalyst or catalyst substrate.

An alternative embodiment of the method according to the invention is described hereinafter. According to this method, the nanotubes or nanofibres are deposited not on a porous SiC substrate, but on a precursor of such a porous SiC substrate, referred to as "SiC precursor" herein. Within the scope of this alternative embodiment, carbon nanotubes or nanofibres are grown on a porous substrate containing carbon and silicon; this substrate is in extrudate or foam form, for example. This substrate and the nanotubes or nanofibres are then converted to SiC.

In one typical embodiment of this alternative embodiment, step (a) comprises the preparation of a precursor of a porous SiC substrate by means of the infiltration of a carbonisable polymer foam with a liquid mixture comprising a duroplastic resin and silicon powder, followed by drying of the infiltrated foam, followed by polymerisation of the resin, and followed by the carbonisation of the resin and the foam.

The duroplastic resin may be undiluted or diluted in a suitable solvent, such as ethanol, acetone or another suitable organic solvent. This makes it possible to adjust the viscosity thereof, promoting the mixture thereof with silicon powder and the infiltration thereof in the polymer foam. Phenolic or furfurylic resins may be used as the duroplastic resin, for example.

An alveolar polyurethane foam is advantageously used as the polymer foam. This foam may for example have an open macroscopic structure wherein the mean diameter is selected between approximately 600 μm and 4500 μm.

After infiltration, the foam may be dried in ambient air. The polymerisation temperature is typically between 130° C. and 200° C., and the carbonisation temperature between 500° C. and 900° C. A temperature of approximately 800° C. is particularly advantageous. Preferably, the treatment is performed in an inert atmosphere (e.g. argon). A carbon network containing silicon inclusions, forming the SiC precursor, is thus obtained.

The incorporation in this SiC precursor of a nanotube or nanofibre growth catalyst may be performed by means of impregnation with an aqueous solution (possibly mixed with an alcohol, such as ethanol) of a nickel, iron, cobalt salt, or a binary or ternary mixture of these three elements; this salt is an active phase precursor. For example, it is possible to deposit a nickel salt, typically $Ni(NO_3)_2$. A metal concentration between 0.1% and 10%, and preferentially between 0.2% and 5% (percentage by mass) is advantageous. The active phase precursor is dried, calcined and converted to the active phase, as described above.

On this material, in step (b), as described above, carbon nanotubes or nanofibres are grown. To obtain a composite material comprising SiC nanotubes or nanofibres on a β-SiC substrate, in step (c), both the carbon nanotubes or nanofibres and SiC precursor are converted into β-SiC, by means of a heat treatment at a temperature between 1200° C. and 1600° C., and preferentially between 1300° C. and 1400° C. A temperature of approximately 1350° C. for a time between 0.5 and 5 hours, and typically of one hour, is suitable. Working in argon is preferred. Under these method conditions, the silicon powder reacts with the carbon in the carbon network; this reaction probably involves SiO vapours generated in situ, diffused from the core of the carbon foam outwards. The oxygen in the SiO is particularly supplied by the passivation layers of the silicon (oxide layer) and the resin). It is also possible to use a further extrinsic source of SiO, as described above. SiC precursor may also be added, as described above.

This alternative embodiment of the method offers the advantage of deactivating the active phase particles (e.g. nickel) used as the carbon nanofibre or nanotube growth catalyst, as said particles are carburised or silicided under the conditions of step (c). These deactivated particles will not interfere with the subsequent use of the composite as the catalyst or catalyst substrate.

As a general rule, the deposition of the nanotubes or nanofibres on the intermediate structure may be performed in situ, i.e. in the reactor according to the invention, or ex situ, i.e. in another reactor. In the latter case, the intermediate structure, for example a prepared SiC foam panel incorporating a lattice of SiC nanofibres, is subsequently assembled in the channel or in the reaction chamber of the reactor. According to the reaction in question, a system with a plurality of panels could be mounted.

1.3 Method C: Channel Filled with a Hierarchised Fibrous Structure (Fibrous Substrate Coated with a Lattice of Nanofibres or Nanotubes).

According to a third method (referred to as method C) the production of the reactor is also divided into two separate steps, the first (identical to methods A or B) consists of machining the host channel(s) and the second consists of producing the hierarchised fibrous host structure. This hierarchised fibrous structure has two scales, the first consisting of a lattice of glass, silica fibres or millimetric optical fibres is coated with a nanometric superstructure of carbon nanofibres or $TiO_2$ nanotubes or nanofibres, said carbon nanofibres or nanotubes being suitable for being converted into SiC by means of any suitable method, particularly that described above ("Method B", "step (c)"). The morphological properties of this millimetric or micrometric fibrous lattice enable satisfactory light transmission and also a homogeneous flow of the fluid in the macroscopic host structure.

The quartz fibres (for example optical fibres) subsequently serve as a substrate for the growth of carbon nanofibres or nanotubes (which may be converted into β-SiC nanotubes or nanofibres by treating with SiO vapour) or $TiO_2$ nanofibres or nanotubes. The growth of carbon nanofibres is performed by means of CCVD (Catalytic Chemical Vapour Deposition) as described in method B by circulating a stream containing $C_2H_6$ and hydrogen on the fibres previously impregnated with a nickel salt.

The growth of the $TiO_2$ nanotubes or nanofibres is carried out by means of the hydrothermal treatment of a $TiO_2$ powder in concentrated sodium hydroxide. After a certain time in an autoclave at 130° C. (varying between a few hours and 72 hours, this time will influence whether $TiO_2$ nanofibres or nanotubes are obtained), the solid obtained is neutralised, washed, dried and calcined (between 150 and 450° C.). The specific surface area obtained varies between 250 and 350 $m^2/g$. The final material consists of a lattice of $TiO_2$ nanofibres or nanotubes on the microfibrous host structure.

The contact between the ceramic foam panel(s) coated with a lattice of SiC, or $TiO_2$ nanofibres or nanotubes, and the walls of the metallic host structure may be made by forming a skin around the panel thus providing the contact points with the walls, and especially with the base wall (i.e. the reaction chamber wall). The adhesion between the ceramic panel, e.g. SiC, and the walls of the metallic or other host structure may also be provided by incorporating a thin layer of enamel providing contact between said catalyst panel and the metallic structure forming the reactor system.

The various members of the reactor may be assembled by means of the various techniques known to those skilled in the art, such as elastomer seal assembly, metallic seal assembly, welding or soldering assembly. For example, the assembly may be carried out either using a Viton™ or Calrez™ seal (if the operating temperature does not exceed 300° C.), or by means of a copper-based compression seal, or by means of welding, e.g. anodic diffusion if the cover is a Pyrex™ panel (photocatalysis application) or soldering. In the latter case, the temperature of use is dependent on the melting point of the soldered mixture which is frequently below 250° C.

2. Assembly Methods for Catalysis Applications

Three embodiments according to the invention are described hereinafter.

2.1 Low-Pressure and Low-Temperature Reactions.

In this embodiment, the reaction according to the invention (consisting for example of a panel provided with a channel filled with carbon nanotubes or nanofibres) described in example 1 (method A) described above is used, and is closed on both sides (bottom and top) using two rectangular panels of the same size and same material (e.g. the same steel grade) as the reactor. These two panels closing the reactor each have an opening opposite each other (e.g. 5 mm in diameter), enabling the entry of the reagents, the passage thereof in the reactor, and the outlet thereof via the other opening. In order to obtain a leak-tight system, the three panels are precision-ground and bonded with graphite insulating tape. The assembly can also be performed by mixing with a suitable cream at a temperature between 200° C. and 230° C.

To heat and control the temperature in the reactor, a rectangular brass panel is machined. Two openings along this panel are provided, wherein heating elements and a thermocouple are placed, respectively. This heating panel may be installed under the main reactor panel. The structure of this reactor is illustrated in the diagram in FIG. 3.

2.2 High-Pressure and/or High Temperature Reaction.

Figure 3:
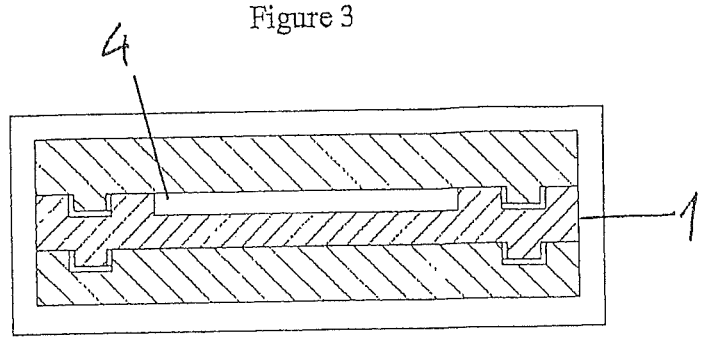
FIG. 3 represents diagrams of the various assembly methods of the reactors according to the invention for pressure and/or temperature applications.
Figure 3:
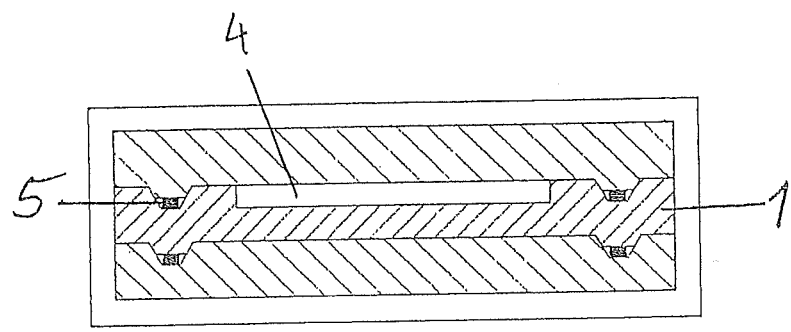
Figure 3:
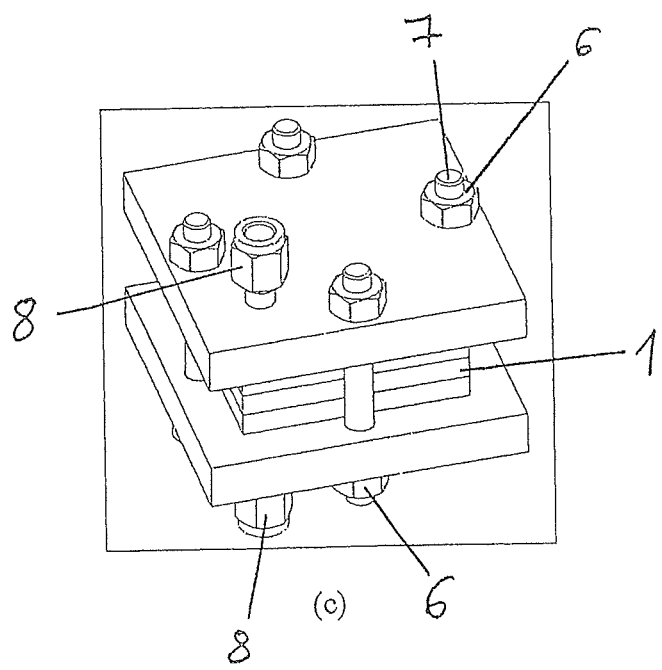

The assembly in the case of a reactor operating at a high pressure and temperature, e.g. >400° C., may be performed in several ways: by soldering as already described in the previous section (high-pressure reaction), by groove assembly with a weld or by fastening directly on a copper seal (diagrams in FIG. 3).

To heat and control the temperature in the reactor, a rectangular brass panel is machined. Two openings along this panel are provided, wherein heating elements and a thermocouple are placed, respectively.

This heating panel may be installed under the main reactor panel (microreactor).

2.3 Reactor Assembly for Photocatalysis Applications.

The bottom of the microreactor produced according to the method described in detail in example 1 hereinafter is sealed with a steel (example 2 Aa) or brass (example 2 Ab) panel. A rectangular quartz panel having the same diameter as the microreactor is bonded thereon. In or in the vicinity of this panel, to enable the lighting of the channels of the hierarchised structure microreactor, a UV or visible source is installed. If the intermediate host structure consists of optical fibres, said structure may also serve as a light source.

3. Active Phase

The active phase precursor, preferentially a metallic compound, is advantageously selected in the group consisting of the elements Fe, Ni, Co, Cu, Pt, Pd, Rh, Ru, Ir, Ti. The metallic compound is preferably a salt or an organo-metallic compound. In the case of a production method according to method B where the reaction chamber is filled with an alveolar β-SiC foam containing aligned β-SiC nanofibre or nanotube zones, other active phases such as aluminosilicates (zeolites for example) may also be deposited. To promote the bonding of the active zeolite layer, the SiC-based substrate is oxidised in air between 800 and 1100° C., more specifically between 850 and 1000° C. and especially between 900 and 950° C. The treatment time varies between 2 and 10 hours, more specifically between 3 and 8 hours and especially between 4 and 6 hours. The treated β-SiC-nanofibre or nanotube composite (preferably with β-SiC nanofibres and nanotubes) is then immersed in a precursor gel solution of the zeolite to be deposited. The synthesis and heat and chemical treatments are those known in the prior art. They may be performed in situ or ex situ.

In the case of photocatalytic reactors with a hierarchised multi-scale structure, representing one class of the microreactors according to the invention, the photocatalytic function is provided by the type of active phase deposited, whether for production method A or B. The latter should comprise at least one semiconductor material in the chemical composition thereof.

The term semiconductor material refers, within the scope of the present invention, to a material wherein the electronic states have a band spectrum comprising a valence band and a conduction band separated by a forbidden band, and wherein the energy required to move one electron from said valence band to said conduction band is preferably between 1.5 eV and 4 eV. Examples of such semiconductor material particularly include titanium oxide, or other metal oxides such as $WO_3$, ZnO or $SnO_2$ or metal sulphides such as CdS, ZnS or $WS_2$ or other compounds such as GaAs, GaP, CdSe or SiC. According to the present invention, titanium oxide is preferentially used, giving particularly satisfactory results.

Within the scope of the present disclosure, the term photoactivated semiconductor material refers to a semiconductor material of the type mentioned above which has been subjected to radiation comprising photons having an energy greater than or equal to the energy required to promote the electrons from the valence band to the conduction band (so-called gap energy between the valence and conduction bands).

Within the scope of the present description, the term photoactivated titanium oxide particularly refers to a titanium oxide subjected to radiation comprising photons having an energy greater than or equal to the energy required to promote the electrons from the valence band to the conduction band, typically radiation comprising photons having an energy greater than 3 eV, preferably than 3.2 eV, particularly radiation comprising wavelengths less than or equal to 400 nm, for example less than 380 nm. Visible light may also be used, if it makes it possible to activate the semiconductor material. This is the case of $TiO_2$ in the form of rutile, for example. If required, for example for anatase $TiO_2$, charge transfer members may be grafted on the semiconductor; they may consist of chromophores and/or nanoparticles ("quantum dots"), made of a second semiconductor material absorbent in the visible spectrum and capable of transferring the charge to the first semiconductor. For example CdS nanoparticles (typically between 2 and 10 nm in size) may be used. A further option for the use of anatase $TiO_2$ is the modification thereof by means of doping; anatase gives rise to a superior quantum yield than the rutile form.

Examples of such radiations particularly cite the radiations supplied by ultraviolet ray lamps such as black light lamps or those supplied by Light-Emitting Diodes (LEDs).

It is known that, in a photoactivated semiconductor material, particularly in a photoactivated titanium oxide, under the effect of radiation of the type mentioned above, electron/gap pairs are created (a gap being an electron deficiency in the valence layer left when an electron jumps to the conduction band), giving the photoactivated semiconductor material pronounced oxidation-reduction properties. These oxidation-reduction properties are particularly pronounced in the case of photoactivated titanium oxide, which are used in numerous photocatalytic applications of titanium oxide.

The deposition of photocatalytic particles on the nanometric superstructures in the microreactor channels may be a discontinuous deposition of isolated photocatalytic particles on the surface of the superstructure, or may consist of a more or less uniform coating covering the surface of the superstructure. The photocatalytic particles may preferably be $TiO_2$ (titanium dioxide), the reference photocatalyst, but not exclusively. Failing this, the photocatalytic particles may consist of a single semiconductor or consist of a mixture of phase wherein at least one is photocatalytic.

In the case of $TiO_2$, the deposition may be obtained by impregnating a solution containing a commercial or at the very least already crystallised $TiO_2$ product, followed by drying to remove the solvent used for impregnation.

One preferential embodiment consists of introducing via the gas phase on the nanostructures, at least one of the precursors used for the preparation of the photocatalytic deposition.

$TiO_2$ synthesis may also be carried out directly on the superstructure, by impregnating the nanometric superstructure with a solution containing the $TiO_2$ precursor, using a synthesis method known as sol-gel synthesis. This precursor may preferentially be a titanium alcoxide, and preferentially titanium isopropoxide. This is followed by a drying and calcination step to crystallise the material in $TiO_2$ form.

$TiO_2$ synthesis may also be performed directly on the superstructure, by circulating a gas stream containing a $TiO_2$ precursor. In a given embodiment, this gas precursor may be a titanium alcoxide vapour or a titanium chloride. This is followed by a drying and calcination step to crystallise the material in $TiO_2$ form. The precise nature of the active phase used according to the invention to develop photocatalytic properties, in that it comprises at least one material activated by light radiation, is not, as a general rule, decisive for the use of a photocatalytic reaction or method in the channel(s) of the microreactor.

In the case of titanium oxide, for example, any titanium oxide developing photocatalytic properties and suitable for bonding in the form of particles or a coating on the nanometric superstructures in the hierarchised microstructure in the microreactor channel(s), may thus be used effectively in the method according to the invention, representing a further advantage of the method.

Nevertheless, according to one embodiment, the titanium oxide used according to the method of the invention contains anatase $TiO_2$, preferably in an amount of at least 50%. According to this embodiment, the titanium oxide used may thus essentially consist (i.e. generally for at least 99% by mass, and preferably for at least 99.5% by mass, or for at least 99.9% by mass) of anatase $TiO_2$.

The use of $TiO_2$ in rutile form also proves to be advantageous, in that $TiO_2$ in this form is photoactivated by the visible light spectrum.

According to a further advantageous embodiment, the titanium oxide used comprises a mixture of anatase $TiO_2$ and rutile $TiO_2$, with a proportion of anatase:rutile by mass between 50:50 and 99:1, for example between 70:30 and 90:10, and typically in the region of 80:20.

Moreover, particularly to optimise the exchanges between the titanium oxide type semiconductor material and the reaction stream, it is most frequently advantageous for the semiconductor material used to have a specific surface area between 2 and 500 $m^2$/g, preferably greater than or equal to 20 $m^2$/g, and more advantageously at least equal to 50 $m^2$/g, particularly in the case of titanium oxide. The specific surface area referred to herein is the BET specific surface area measured by means of nitrogen adsorption using the Brunauer-Emmet-Teller technique, well known to those skilled in the art. For this purpose, it is particularly possible to use a titanium oxide having a high specific surface are per se.

The photoactivated semiconductor material used according to the invention may be in various physical forms, according to the medium treated, and particularly according to the volume of said medium and speed at which it is desired to implement the method. As a general rule, the titanium oxide type semiconductor material may be used in any form suitable for the irradiation thereof by radiation having a wavelength enabling the photoactivation thereof and enabling the contact of the titanium oxide in the photoactivated state with the molecules in the reaction stream, provided that the latter is accessible.

4. Catalysis and Photocatalysis

The reactor according to the invention may be used to catalyse chemical reactions, such as the oxidation of CO to $CO_2$, the hydrogenation and/or dehydrogenation of hydrocarbons and organic compounds, alcohol oxidation or photocatalysis for hydrogen production.

5. Applications as a Mixer and/or Filter

The reactor according to the invention may also be used as a gas-gas and/or gas-liquid and/or liquid-liquid mixer where the microstructure makes it possible to obtain satisfactory homogeneity of the mixture rapidly by means of turbulence generated by the nanoscopic structure of said system. In the case of method B, the high effective conductivity of the alveolar substrate enables superior homogenisation of the temperature to optimise heat exchange.

The reactor according to the invention may also be used as a filter for filtering ions dissolved in liquid phases or for filtering bacteria, viruses or any other related compounds in a liquid or gas phase.

6. Advantages of the Reactor According to the Invention

A first advantage, the selectivity of the chemical reactions, has already been mentioned: firstly, the lack of ink-bottled pores gives rise to superior selectivity, secondly, the excellent heat conductivity of the nanometric superstructure to the macroscopic host structure prevents the formation of hot spots, which decrease selectivity.

A further advantage is that the nanometric superstructure does not give rise to a significant head loss.

A further advantage is the superior surface area to volume ratio of the reaction chamber. In the reactors according to the prior art, the active surface area exposed to the reagent stream is generally confined to the wall and a non-negligible portion of the channel is not effective for the reaction in question. The increase in the surface area to volume ratio would only be possible by reducing the size of the flowing channel to the detriment of the production cost and head loss.

To improve the surface area to volume ratio, microreactors wherein the channels are interspersed with micrometric sized blocks have been designed and used in the literature. The purpose of these blocks is to increase the surface area to volume ratio, thus promoting superior mixing of the reagents and a superior reagent/catalyst contact surface area.

For example, take the case of a channel of a microreactor having the following dimensions: l, length, w, width, h, height. The volume of the parallelepiped will be calculated using the following formula: $V = l \times w \times h$, whereas the effective surface area covered by the catalyst deposited on the two walls and on the lower face will be given by the following formula: $S_{effective} = (w \times l) + 2(h \times l)$. The surface area (S) to volume (V) ratio will be given by the following equation: $S/V = 2/w + w/h$ thus the dimensional unit will be in $m^{-1}$. For example: for the microreactor having the following dimensions: l=0.05 m, w=0.04 m, h=0.002 m with a channel would thus give a total volume of $V = 4 \times 10^{-6}$ $m^3$, the effective surface area will be equal to $S_{effective} = 2.2 \times 10^{-3}$ $m^2$. This will thus give a surface area to volume ratio $S/V = 550$ $m^{-1}$.

By integrating a micrometric sized block system, e.g. 5 µm in diameter and 2 mm in length, with a distance between blocks of 5 µm, we obtain a surface area to volume ratio $S/V = 2.0 \times 10^5$ $m^{-1}$. The increase in the ratio S/V in the present invention would be 360-fold.

However, in the present invention where the channel described above is filled with a lattice of carbon nanotubes (100. $10^{-6}$ mm in diameter and 2 mm high with a distance between two tubes of 200. $10^{-6}$ mm) aligned perpendicularly with the lower face, we obtained a surface area to volume ratio $S/V = 3.5 \times 10^6$ $m^{-1}$. In the present invention, the ratio S/V is increased $6.3 \times 10^3$ times, or 17 times more than for filling the same channel with the block system.

Finally, the hierarchised multi-scale structure reactors have the advantage of being able to couple in the same tool "chemical generators or reactors" (all nanometric superstructures) and the heat exchanger (alveolar foam bed). The consequences of this in-situ coupling give rise to a single compact tool with no discontinuity in the metric scale (millimetric host structure, micrometric alveolar foam bed, micrometric fibres and nanometric reactor) enabling a remarkable integration of the heat exchange functions and the high thermicity catalytic reaction.

A further advantage of the reactor according to the invention is the high resistance of the SiC (particularly β-SiC) and $TiO_2$ nanotubes in an oxidant medium, acid medium and basic medium. The resistance in an oxidant medium at a high temperature represents a particular advantage for regenerating the catalyst. Indeed, it is observed that, during the operation of the reactor, various carbon-containing products and residues are deposited on the nanotubes or nanofibres and block the access to the active phase. This particularly gives rise to a decrease in the catalytic yield. In the case of regeneration (calcination) in an oxidant medium, these carbon-containing products and residues may be removed. The oxidation resistance of the catalyst substrate of a reactor according to the invention is such that such a reactor or substrate may be regenerated by means of a calcination treatment without damaging or impairing the nanotubes or nanofibres. This method is performed at a temperature greater than 500° C., and advantageously at a temperature between 500° C. and 700° C. It may be performed in air. For this method, it is preferred that the nanotubes or nanofibres are deposited either directly on the wall of the reactor, or on a β-SiC foam.

This regeneration may be performed directly in the reactor, but if the nanotubes or nanofibres are on an intermediate structure or on a removable member, it is preferable (so as not to overheat the reactor seals) to remove said intermediate structure or said removable member from the reactor and perform the regeneration of the catalyst in a chamber dedicated to this operation.

Applied to a reactor according to the prior art comprising carbon nanotubes or nanofibres, such a regeneration treatment gives rise to an irreversible impairment of the physicochemical properties of said nanotubes or nanofibres, and thus results in degradation of the catalyst.

EXAMPLES

The various embodiments and advantages of the method described above may be illustrated by examples. The purpose of the examples given is to illustrate the invention and they are not limitative.

Example 1

Production of Hierarchised Structure Reactors

Method A

To prepare the main panel of the microreactor, a part made of heat-resistant steel is cut to the dimensions 50×40×5 mm whereon a 34×28×2 mm channel is machined. At both ends of the channel, two rectangular openings are produced and used as the gas mixing space and for a gas inlet and outlet. The channels are connected to reagent admission systems on either side of the panel.

The steel panel channel is subsequently coated by means of spin coating or with a pipette with a thin layer of HSQ (hydrogen silsesquioxane) which is subsequently converted into $SiO_2$ by means of heat treatment for 4 hours at 400° C. The 200 nm thick $SiO_2$ layer is a substrate for the nucleation and growth of the carbon nanotubes.

The growth of the aligned carbon nanotubes in the channel is performed by means of CCVD (Chemical Catalytic Vapour Deposition) in the tubular reactor by circulating a mixture containing ferrocene (purity: 99%, Strem Chemicals) in toluene (purity: 99.5%, Alfa Aesar) (15 g of $(Fe(C_5H_5)_2/1$ l of toluene), measured with argon (Linde) at a rate of 1.5 l/min. Synthesis is performed at 850° C. for 2 hours resulting in a channel filled with aligned carbon nanotubes.

The carbon nanotubes are attached securely to the steel surface as there is no loss after the panel has been sonicated for 10 min.

The carbon nanotubes obtained are then purified by converting the residual iron (following synthesis) into iron oxide by means of heat treatment between 200 and 300° C., preferably between 220 and 260° C. and especially between 230 and 260° C., for at least 1 hour and subsequently by washing in the presence of an aqueous citric acid solution (10%) (Merck).

After cleaning in water, the carbon nanotube panel is dried at ambient temperature for 24 hours and at 100° C. for 1 hour.

The morphology of the carbon nanotubes obtained is characterised by means of scanning electron microscopy (Jeol 6700-FEG, operating with a voltage acceleration of 3 kV) and transmission electron microscopy (Topcon 002B-UHR, operating with a voltage acceleration of 200 kV). The carbon nanotubes are homogeneous with an approximate external diameter of 100 nm (FIG. 4). The specific surface area obtained on the basis of nitrogen absorption isotherms is 60 $m^2.g^{-1}$ and was measured with an automatic apparatus (TRISTAR, Micromeritics). The carbon nanotubes or nanofibres from this method may then be converted into SiC.

Method B

An alveolar β-SiC-based foam is impregnated with 1% by weight of nickel. The growth of the carbon nanofibres on the foam surface is performed with a mixture containing $C_2H_6$ and hydrogen (volume ratio of 40:60) at a temperature of 680° C. for 2 hours. The formation of the carbon nanofibres is homogeneous on the entire foam surface. Observation at a high magnification shows that the nanofibres are significantly interlocked with a mean diameter of 60 nm and a length frequently exceeding several hundreds of micrometres (4). The incorporation of the carbon nanofibres in the foam structure enabled a significant increase in the specific surface area of the final composite, from 25 $m^2.g^{-1}$ to more than 120 $m^2.g^{-1}$. This increase in the specific surface area is attributed to the large external surface area of the carbon nanofibres.

The carbon/SiC nanofibre composite is subsequently converted into silicon carbide in the presence of SiO vapour at a temperature of 1280° C. The conversion of the carbon nanofibres into SiC nanofibres gave rise to a drop in the specific surface area of the final composite from 120 $m^2.g^{-1}$ to 50 $m^2.g^{-1}$ due to sintering problems during carburation giving rise to larger SiC nanofibres.

On the other hand, the conversion of the carbon nanofibres into SiC nanofibres made it possible to increase the oxidation resistance of the composite significantly. Heating in air at 1000° C. only induces a 5% by weight oxidation content of the composite, whereas for carbon nanofibres, total combustion starts at a markedly lower temperature, i.e. 650° C.

Method C

The fibrous host structure for the growth of the carbon nanofibres or $TiO_2$ nanotubes is a woven glass fibre (Sinto, Aubagne, France) with a low specific surface area (less than 1 $m^2/g$) and a mean fibre diameter of 10 µm. 1% by mass of nickel was deposited by impregnating these macroscopic fibres with a nickel salt $Ni(NO_3)_2.6H_2O$ (Merck) in an ethanol solution (0.9 ml of ethanol containing 0.19 mol/l of nickel per 0.5 g of glass fibres). The evaporation of the solvent was performed overnight at ambient temperature, followed by drying at 110° C. for 10 hours and by calcination at 350° C. for 2 hours. After reducing to 400° C. in hydrogen for 2 hours to obtain metallic nickel particles, carbon nanofibre synthesis was obtained by means of CCVD (Chemical Catalytic Vapour Deposition) in an ethane/hydrogen mixture (molar ratio of 1:5 for a total flow rate of 120 ml/min) at 700° C. for 1 hr using 0.5 of the Ni/glass microfibre substrate (FIG. 5).

The growth of the $TiO_2$ nanofibres and nanotubes (also referred to as titanate nanotubes) (FIG. 6) is performed by means of hydrothermal treatment at 130° C. of a TiO$_2$ powder in concentrated NaOH (10 M). Typically, 1 g of powdered TiO$_2$ (P25, Degussa) is added to 50 ml of a NaOH solution (10 M) in a Teflon autoclave; the whole containing the reagents cited above and the host glass fibres is stirred for one hour and left at 130° C. for 48 hours. The white powder obtained is then filtered in a vacuum and washed with HCl (2 M) until neutrality, rinsed with distilled water, and dried overnight at 110° C. A post-synthesis calcination treatment is performed at 380° C.

It is also possible to deposit the TiO$_2$ nanofibres or nanotubes by means of CVD (Chemical Vapour Deposition) using a vapour containing titanium (such as TiCl$_4$), in the presence of a source of oxygen, such as water vapour.

Example 2

Photocatalytic Phase Deposition

A SiC nanofibre/SiC foam composite filling the channels of the microreactor, coated very homogeneously with an active phase, TiO$_2$ (FIG. 8), was produced. The TiO$_2$ nanoparticles cover the SiC nanofibre superstructure with an excellent mechanical resistance demonstrated by a lack of TiO$_2$ loss after 30 minutes of sonication. TiO$_2$ particle deposition was performed directly during TiO$_2$ synthesis using a sol-gel process. For this, the SiC nanofibre/SiC foam composite is impregnated with an ethanol (1.4 ml/g SiC)/titanium tetraisopropoxide (0.65 ml/g SiC) solution. The synthesis of the sol-gel, directly on the composite, is then performed by circulating water vapour (obtained by bubbling air in a saturator containing liquid water at ambient temperature) at a flow rate of 100 ml/min. In contact with moisture, gelling is performed to form a titanium hydroxide. The whole is then calcined at 350° C. for 2 hours to obtain the final hierarchised material with active phase, consisting of the TiO$_2$ nanoparticles/SiC nanofibres/SiC foam, deposited in the microreactor channels.

Example 3

Catalysis Application

A reactor according to the invention was used for the methanol dehydration reaction to dimethyl ether. The catalyst used in this reaction is zeolite ZSM-5 (MFI family) deposited directly on the surface of the substrates by means of hydrothermal synthesis at 170° C. for 48 hours. The substrates were:

A: an alveolar β-SiC foam;
B: the same alveolar β-SiC foam coated with SiC nanofibres.

In both cases, the concentration of zeolite H-ZSM5 was 30% by mass in relation to the mass of the catalyst. The reaction was performed at 270° C. with 0.2 ml of liquid methanol per minute and an argon gas stream at 80 ml/min. It is noted that the conversion rate exceeds 50% in the presence of SiC nanofibres, whereas it barely exceeds 30% in the absence of SiC nanofibres (see FIG. 10).

This improvement in the conversion yield of the substrate (b) is probably associated with the greater specific surface area thereof.

Example 4

Application as Liquid-Liquid Mixer

Two single-channel panels having the following dimensions: length, 50 mm, width, 40 mm, height, 2 mm, wherein the channel is filled with optionally aligned carbon nanotubes, were tested as a mixer for the preparation of a colloidal solution between water and toluene in the presence of a surfactant agent (Triton X-100, Aldrich). The flow rate of both solutions at the reactor inlet is set to 20 ml.min$^{-1}$. The water is stained by adding a known quantity of cobalt nitrate (red) to enable a better distinction of the quality of the mixture. The mixture after passing through the reactor is retrieved and the segregation time is measured.

Two different intermediate structures were tried: carbon felt and alveolar SiC foams, each as is or decorated with a secondary lattice based on SiC nanofibres or nanotubes.

The results obtained are given in FIG. 9. The alveolar foam decorated with a lattice of SiC nanofibres has the best efficacy as a mixer followed by the carbon felt-based structure and that of the bare alveolar foam.

The head loss measured on these structures varies according to the following sequence: alveolar foam<alveolar foam decorated with nanofibres<carbon felt.

The superior homogeneity of the mixture (i.e. the finer droplet size) using both liquids is obtained with an alveolar β-SiC-based foam coated on the surface thereof with a three-dimensional lattice of SiC nanofibres. This system displays the best stability (high segregation time). The addition of these SiC nanofibres to the alveolar β-SiC foam only modifies the system head loss very slightly.

Example 5

Application in Liquid Microparticle Filtration

A lined alveolar β-SiC foam (panel a) and the same alveolar β-SiC foam lined with SiC nanofibres (panel b) were used. The liquid phase contained kaolin particles, with a mean size of approximately 10 μm. It is noted that the filtration coefficient, assessed under the same conditions, increases by approximately 25 m$^{-1}$ (panel (a)) to approximately 48 m$^{-1}$ (panel (b)).

BIBLIOGRAPHIC REFERENCES

Other bibliographic references used in the above disclosure:

[1] M. Lacroix, P. Nguyen, D. Schweich, C. Pham Huu, S. Savin-Poncet, D. Edouard "Pressure drop measurements and modelling on SiC foams." Chemical Engineering Science, vol. 62: 3259-3267 (2007).

[2] Groppi, G. and E. Tronconi; "Design of novel monolith catalyst supports for gas/solid reactions with heat exchange." Chemical Engineering Science 55(12): 2161-2171 (2000).

[3] Giani, L., G. Groppi, et al.; "Mass-Transfer Characterization of Metallic Foams as Supports for Structured Catalysts". Ind. Eng. Chem. Res. 44: 4993-5002 (2005).

[4] Bhattacharya, A., V. V. Calmidi, et al.;. "Thermophysical properties of high porosity metal foams." International Journal of Heat and Mass Transfer 45(5): 1017-1031 (2002).

[5] Boomsma K, Poulikakos D.; "On the effective thermal conductivity of a three-dimensionally structured fluid-saturated metal foam." International Journal of Heat and Mass Transfer 44: 827-836 (2001).

The invention claimed is:

1. A reactor comprising at least one reaction chamber having an inner wall, said inner wall of said reaction chamber being filled at least partially with a high specific surface area material having a specific surface area greater than 5 m²/g, said high specific surface area material being selected from $TiO_2$ nanotubes or nanofibres, wherein said nanotubes or nanofibres are deposited on an intermediate structure which is first deposited on said wall of said reaction chamber and is selected from the group consisting of glass fibres, carbon fibres, SiC foams, carbon foams, and alveolar β-SiC foams, wherein said intermediate structure fills the reaction chamber of said reactor at least partially.

2. The reactor according to claim 1, wherein said nanotubes or nanofibres have a mean diameter between 40 and 200 nm.

3. The reactor according to claim 2, wherein said nanotubes or nanofibres have a mean diameter between 50 nm and 150 nm.

4. The reactor according to claim 3, wherein said nanotubes or nanofibres have a mean diameter between 60 nm and 120 nm.

5. The reactor according to claim 1, wherein the specific surface area of said high specific surface area material is at least 15 m²/g.

6. The reactor according to claim 5, wherein the specific surface area of said high specific surface area material is between 30 m²/g and 300 m²/g.

7. The reactor according to claim 1, wherein said nanofibres or nanotubes are aligned on at least a portion of the said reaction chamber.

8. The reactor according to claim 1, wherein the reaction chamber of said reactor is machined of at least one material selected from the group consisting of materials based on silicon, glass, quartz, ceramic or steel or combinations thereof.

9. The reactor according to claim 1, wherein said nanofibres or nanotubes are coated with a layer of metal oxide or zeolite.

10. The reactor according to claim 9, wherein the metal oxide is albanite or zirconia.

11. The reactor according to claim 1, wherein said nanofibres or nanotubes comprise a catalytically active phase, deposited using a precursor which is a metal compound, said metal compound being selected from the group consisting of the elements Fe, Ni, Co, Cu, Pt, Pd, Rh, Ru, Ir, Ti and alloys thereof.

12. The reactor according to claim 1, wherein said intermediate structure consists of optical fibres, and wherein said intermediate structure serves as a light source.

13. A method for producing a reactor according to claim 1, wherein said method comprises:
   (a) applying an intermediate structure to at least a portion of the inner wall of said reactor, said intermediated structure being selected from the group consisting of silica fibres, optical fibres, and quartz fibres;
   (b) growing the $TiO_2$ nanotubes or nanofibres on said intermediate structure by means of a hydrothermal treatment of a $TiO_2$ powder in concentrated sodium hydroxide and
   (c) if the nanotubes or nanofibers are grown by means of deposition, neutralizing, washing, drying and calcinating the nanotubes or nanofibers at a temperature between 150° C. and 450° C.

14. A method for producing a reactor according to claim 13, wherein the $TiO_2$ nanotubes or nanofibres are grown on said intermediate structure by means of a chemical vapor deposition process using a vapor containing titanium in the presence of oxygen.

* * * * *